United States Patent [19]

Oshima et al.

[11] Patent Number: 5,204,579

[45] Date of Patent: * Apr. 20, 1993

[54] CERAMIC INSULATOR FOR SPARK PLUG STRUCTURE

[75] Inventors: Takafumi Oshima; Shigeyasu Yamada; Kazuhiko Kozuka, all of Nagoya, Japan

[73] Assignee: NGK Spark Plug Co., Ltd., Nagoya, Japan

[ * ] Notice: The portion of the term of this patent subsequent to Aug. 14, 2007 has been disclaimed.

[21] Appl. No.: 399,704

[22] Filed: Aug. 25, 1989

[30] Foreign Application Priority Data

Aug. 25, 1988 [JP] Japan ................................. 63-209450
Dec. 9, 1988 [JP] Japan ................................. 63-312186

[51] Int. Cl.$^5$ ........................ H01T 13/20; H01T 13/38
[52] U.S. Cl. ..................................... 313/143; 313/144
[58] Field of Search ............... 313/137, 141, 136, 144, 313/143

[56] References Cited

U.S. PATENT DOCUMENTS

| 2,453,048 | 11/1948 | Tognola et al. | 313/137 X |
| 4,393,324 | 7/1983 | Nishio et al. | 313/136 X |
| 4,427,915 | 1/1984 | Nishio et al. | 313/136 X |
| 4,870,319 | 9/1989 | Benedikt et al. | 313/137 |
| 4,949,006 | 8/1990 | Oshima et al. | 313/144 |

*Primary Examiner*—Sandra L. O'Shea
*Attorney, Agent, or Firm*—Cooper & Dunham

[57] ABSTRACT

A ceramic insulator structure for use in a spark plug is manufactured by mixing granular or powdery particles of AlN, $Si_3N_4$ or $Al_2O_3$ with an organic binder and an auxiliary sintering agent, the average spherical diameter of the particles making up the resulting ceramic mixture being in the range 20–100 microns. The ceramic mixture is then pressed in a mold into a desired shape and sintered at a temperature of 1600°–2000° C.

5 Claims, 11 Drawing Sheets

CERAMIC INSULATOR FOR SPARK PLUG STRUCTURE

BACKGROUND OF THE INVENTION

1. Field of the Invention

The invention relates to method of moulding a ceramic insulator for a spark plug structure in use for an internal combustion engine, and particularly concerns to an improved press for moulding granular or powdery materials by compaction.

2. Description of Prior Art

In moulding a ceramic insulator 100, binder agent and auxiliary sintering agent are added to ceramic powder to form a spray powder 110 as seen in FIG. 9. The spray powder 110 thus formed, is compacted into bullet shape configuration 120 by press. Then, the compacted ceramic is shaped by means of honing, and sintered.

However, the prior art has disadvantages as follows:

(A) An outer layer of high good density portion of the ceramic insulator is shaped, thus deteriorating the granular spray to impede reduction of numbers of blow holes, leading to lowering perforation voltage.

(B) Due to the shaping, a great quantity of non-reusable chips insulator costly.

(C) The shaping only allows a rotary body, thus restricting designing degree of freedom.

Therefore, it is an object of this invention to provide method of mould a ceramic insulator of a spark plug structure which is capable of determining a relatively high perforation voltage with minimum cost and high designing degree of freedom.

According to the present invention, there is provided method of moulding a ceramic insulator of a spark plug structure comprising steps of; making granular or powdery materials by mixing ceramic powder such as (AlN), ($Si_3N_4$) or ($Al_2O_3$) with an organic binder and an auxiliary sintering agent, so that average spherical diameter of the mixed powder falls within 20-100 microns; forcing the mixed ceramic into a mould, and pressed in an appropriate configuration; the ceramic thus pressed being sintered under normal pressure at the temperature of 1600-2000 degrees centigrade.

According to the present invention, cutting operation is eliminated at the time of shaping the ceramic insulator. This enables to remain an outer layer of the ceramic insulator to lower the number of blow holes so as to produce high density insulator with a high perforation voltage ensured.

No cutting chips are produced to reduce number of manufacturing processes to contribute to cost-saving.

Moulding according to the method allows not only rotary body but non-rotary body to ensure a high designing degree of freedom.

According, further, to the method of the present invention, the ceramic insulator includes a front half piece made of aluminum nitride (AlN) and a rear half piece made of alumina ($Al_2O_3$), the two pieces are bonded at their respective ends by means of mortise tenon joint.

This needs minimum quantity of expensive aluminum nitride (AlN) to lead to cost-saving, and thermal shock resistance.

The mortise tenon joint allows to strengthen the bond between the front and rear half pieces by compression force and transverse direction stress when the ceramic insulator gets a high temperature.

Various other objects and advantages to be obtained by the present invention will appear in the following description and in the accompanying drawings.

DETAILED DESCRIPTION OF THE EMBODIMENTS

Figure 1:
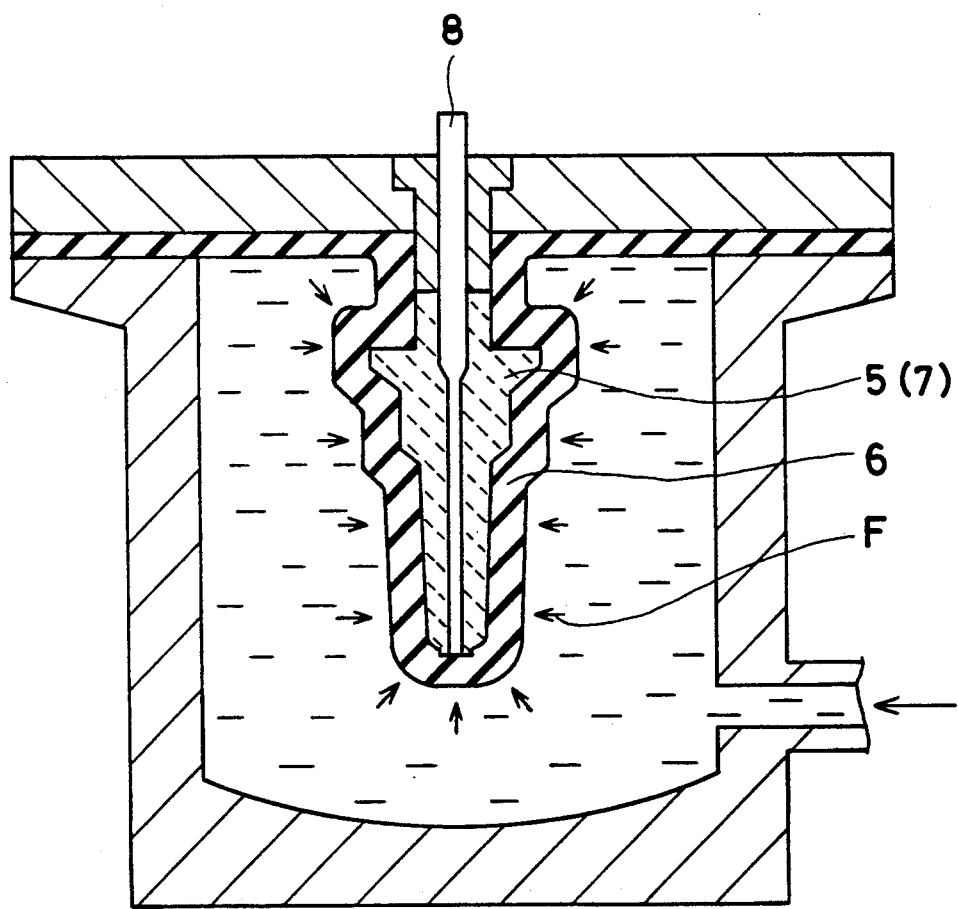
FIG. 1 is a schematic view of manufacturing principal of press formation of a spark plug according to first embodiment of the invention.
Figure 2:
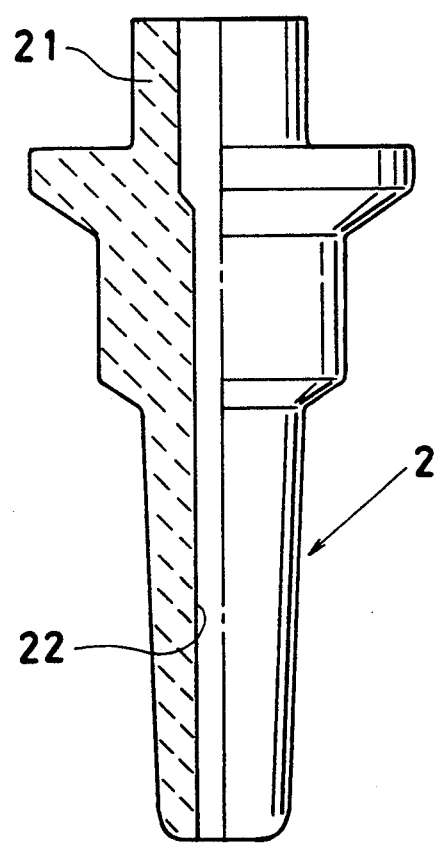
FIG. 2 is partly sectioned view of an insulator.
Figure 3:
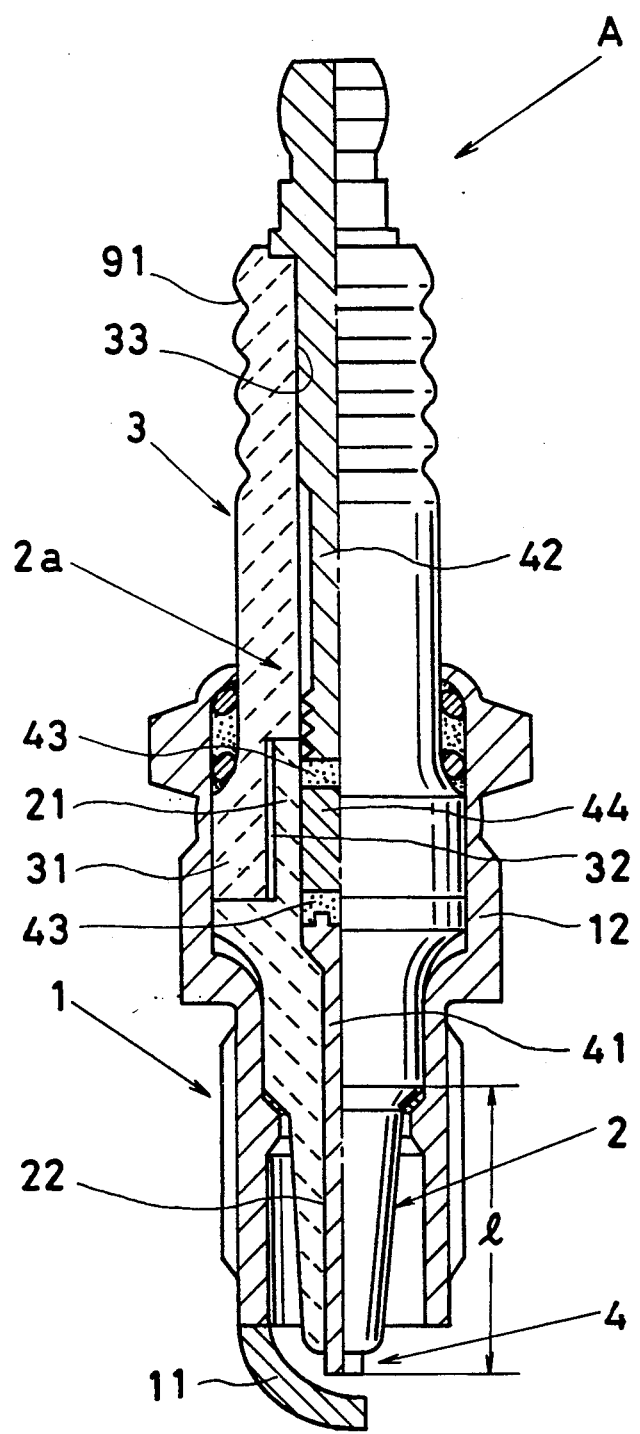
FIG. 3 is a view of a spark plug, but half of the plug is sectioned.

Referring to FIGS. 1 through 3, a spark plug (A) according to the present invention, has a cylindrical metallic shell 1 and a tubular insulator 2a consisting of a front half piece 2 and a rear half piece 3.

The front half piece 2 has a projection 21 at the rear end, while the rear half piece 3 has a recess 31. The front and rear half pieces 2, 3 are bonded by joining the projection 21 to the recess 31 by way of a glass sealant 32 of high melting point in a manner of mortise tenon joint. Into the insulator 2a, a center electrode 4 is concentrically placed to form a spark plug gap with a ground electrode 11 depended from the metallic shell 1 which is made of low carbide steel. The rear half piece 3 is made of sintered alumina ($Al_2O_3$) body. The mortise tenon joint portion is located at portion corresponding to a barrel 12 of the metallic shell 1. The center electrode 4 is placed at axial bores 22, 33 each provided with the insulator 2a, and a firing tip 41 and a terminal tip 42 are integrally sealed through a resistor 44 and an electrically conductive glass 43.

The front half piece 2 of the insulator 2a is made as follows:

(a) Low polymerized polyvinylalcohol-based binder, and yttrium oxide ($Y_2O_3$) are added to aluminum nitride (AlN) powder which has 0.6-0.7 microns in spherical diameter to form secondary particles of 50-70 microns in average spherical diameter (referred to as spray powder 5 hereinafter).

(b) The spray powder 5 is placed into a rubber mould 6 which is made in accordance with a shape of the front half piece 2, and pressed by means of oil pressure F for 10-20 seconds under the pressure of 1.2 t/cm² at normal temperature to form a compaction body 7 (see in FIG. 1). It is noted that a bar 8 is used for the purpose of providing the bore 22. The rubber mould 6 has been determined at its capacity to be generally 120 (%) with the spray powder 5 empty.

(c) The compaction body 7 is taken of the mould 6 6 with elastic deformation of the rubber mould 6 accompanied, and sintered at the temperature of 1600–2000 degrees centigrade under nitrogen gas atmosphere to form the ceramic insulator 2a.

In the meanwhile, the rear half piece 3 is made in a manner similar to that of the front half piece 2, but sinter is at the atmosphere. then the front and rear half pieces 2, 3 are bonded each other in the same manner as mentioned above.

Heretofore, tolerance of a mould, machining precision and contraction of the mould have been hindering to put the processes into practice, and remaining the processes within only concept.

Experiment is carried out by preparing the spark plug (A) and a prior art counterpart with each of the spark plugs mounted on 1000 cc turbocharged engine.

It is found that the spark plug (A) according to the invention, has improved by 10–20 (%) at perforation voltage.

Further, it is found that the processes contributes to cost-saving and reduction of manufacturing processes in opposition to the case in which a number of non-reusable cutting chips had produced.

Figure 4:
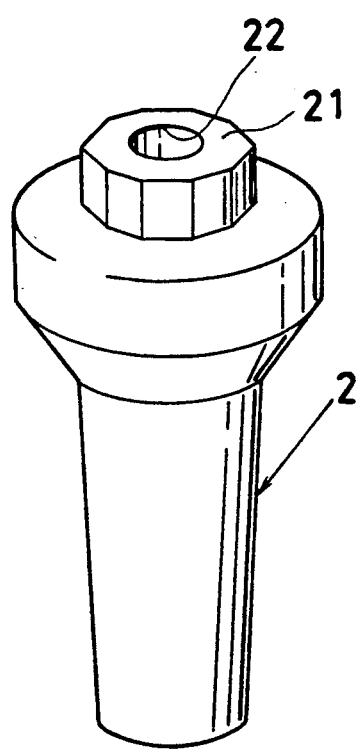
FIG. 4 is a perspective view of a front half piece of an insulator according to second embodiment of the invention.

Now, referring to FIG. 4, second embodiment of the invention is described hereinafter.

In this second embodiment, the projection 21 of the front half piece 2 is in the form of polygonal, which works to strengthen the mortise tenon joint.

Figure 5:
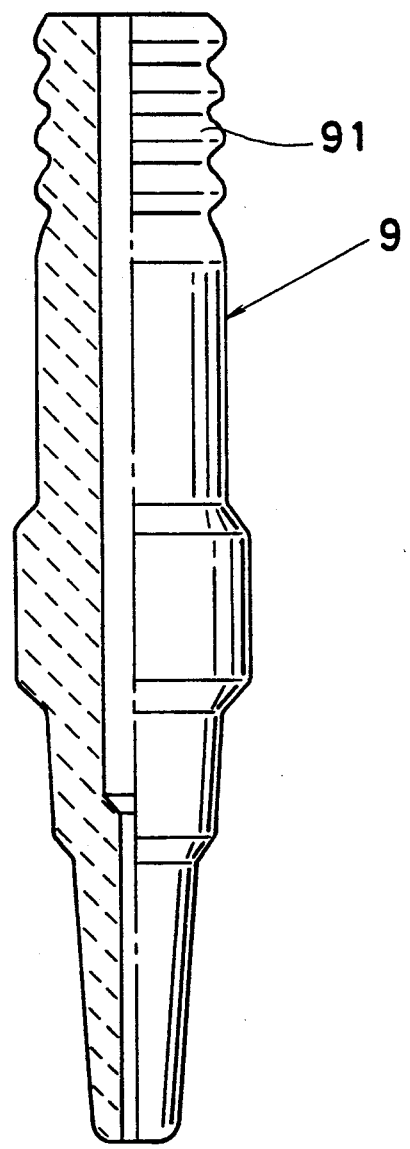
FIG. 5 is a view of a spark plug, but half of the plug is sectioned according to third embodiment of the invention.
Figure 6:
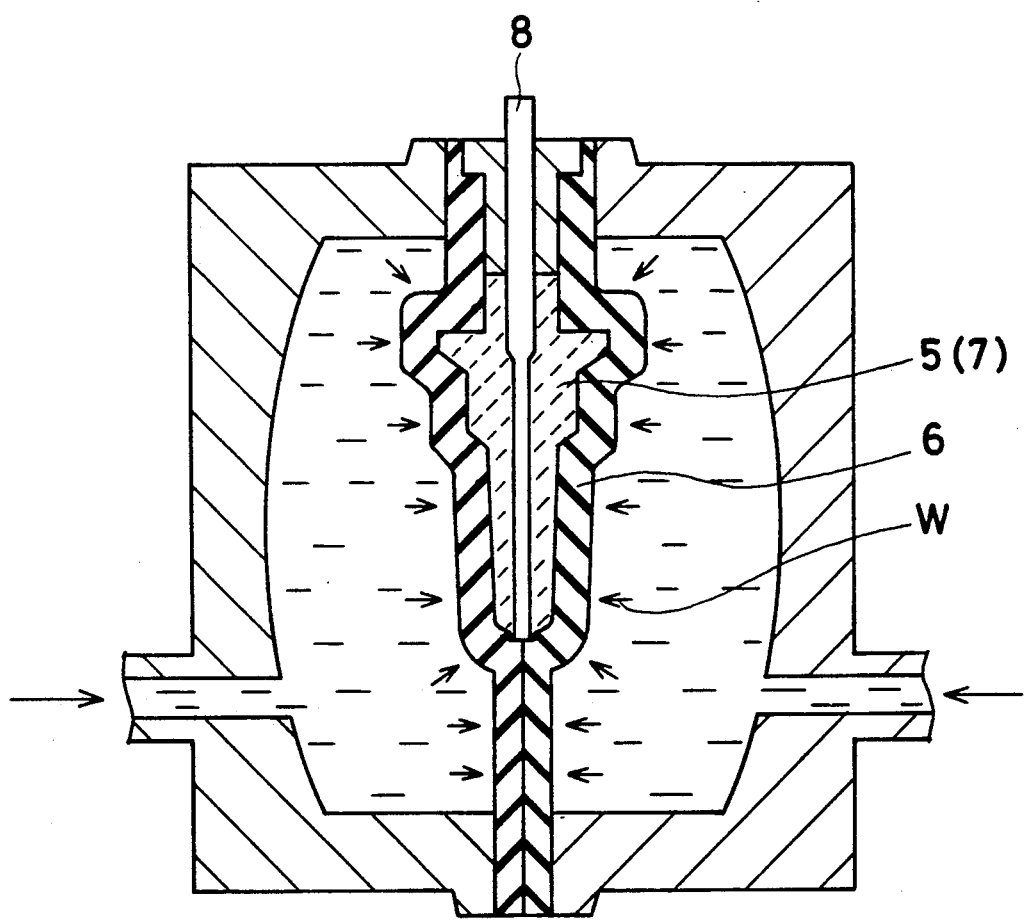
FIG. 6 is a principal view of press mould according to second embodiment of the invention.

Referring to FIG. 5, third embodiment of the invention is described below.

According to the third embodiment of the invention, and an insulator 9 including rear half piece having an upper corrugation 91 is made of aluminum nitride (AlN), silicon nitride ($Si_3N_4$) or alumina ($Al_2O_3$).

Figure 7:
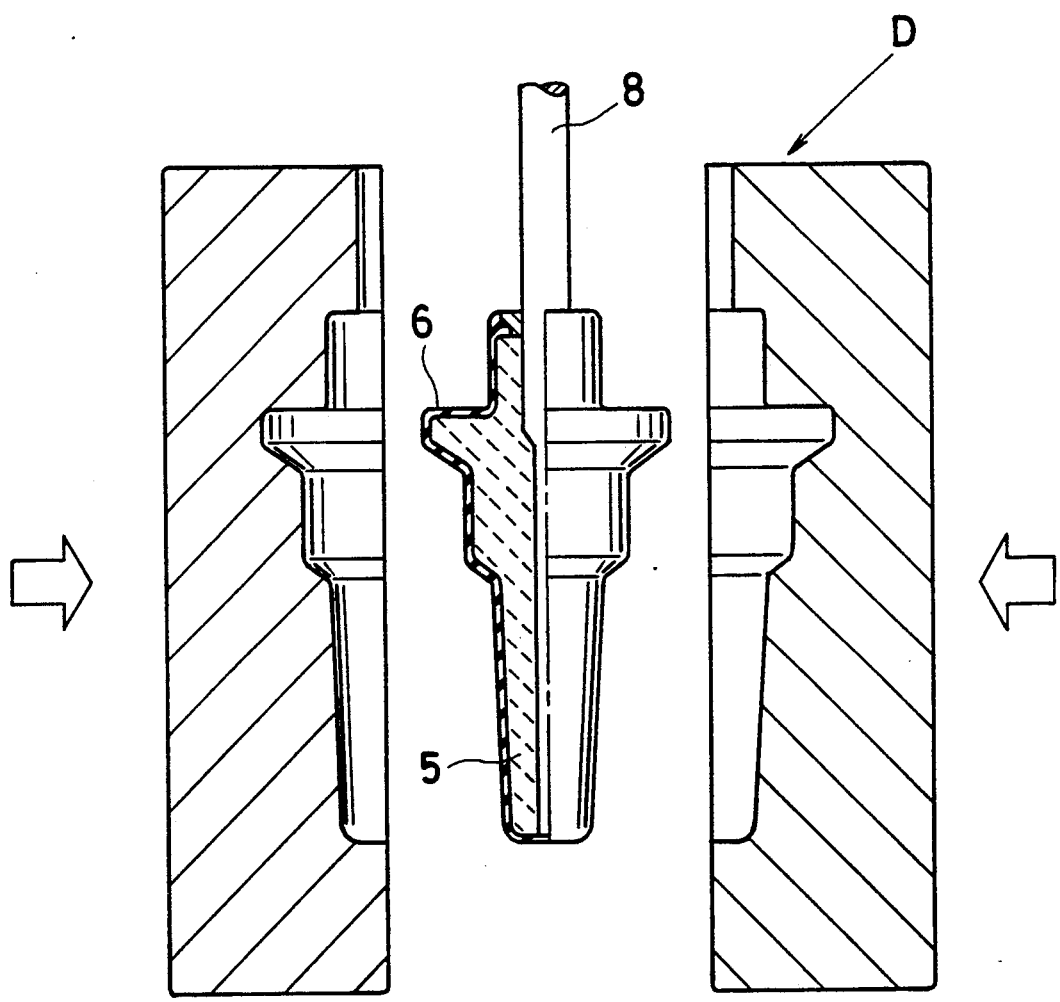
FIGS. 7 and 8 are principal views of press mould according to third embodiment of the invention.
Figure 8:
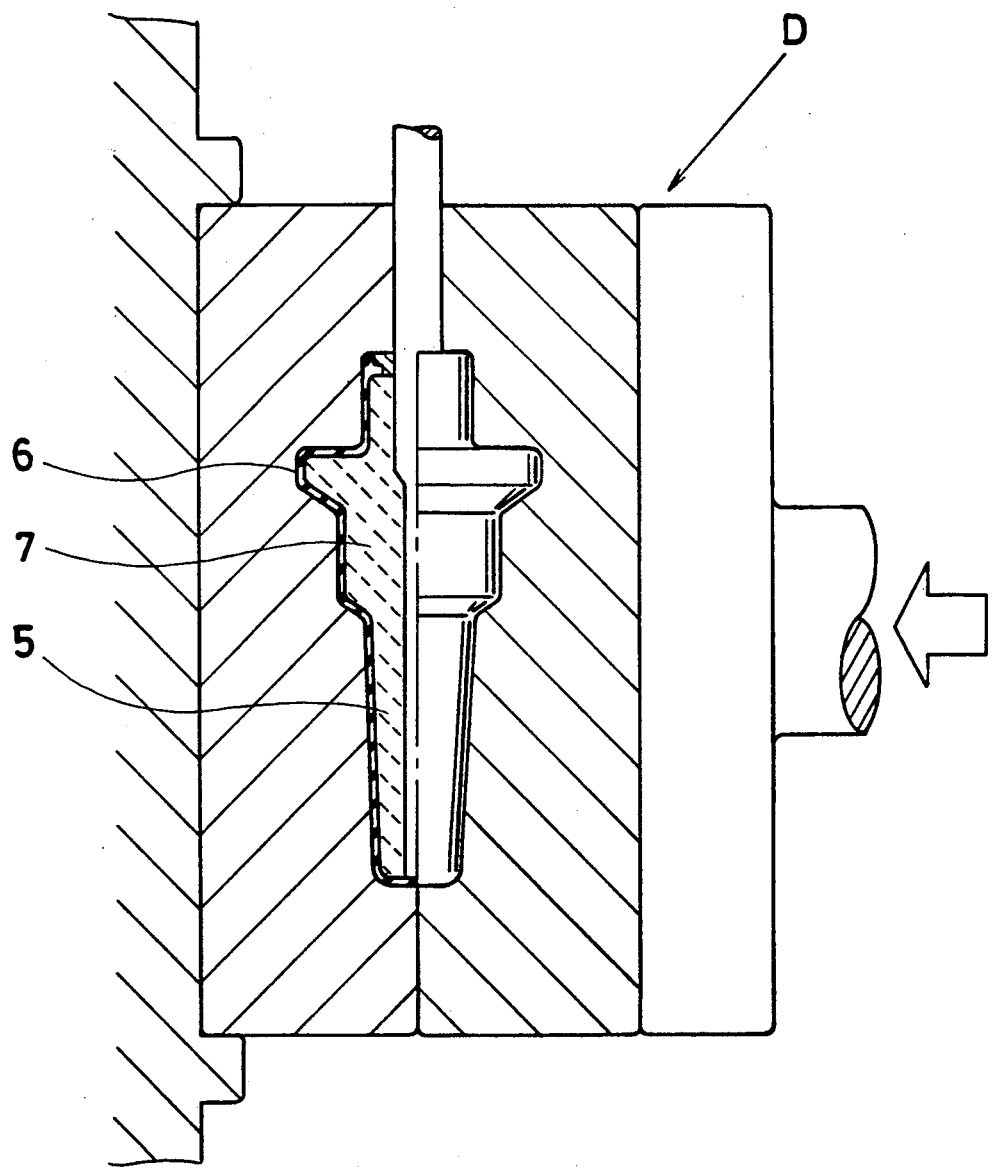
Figure 9:
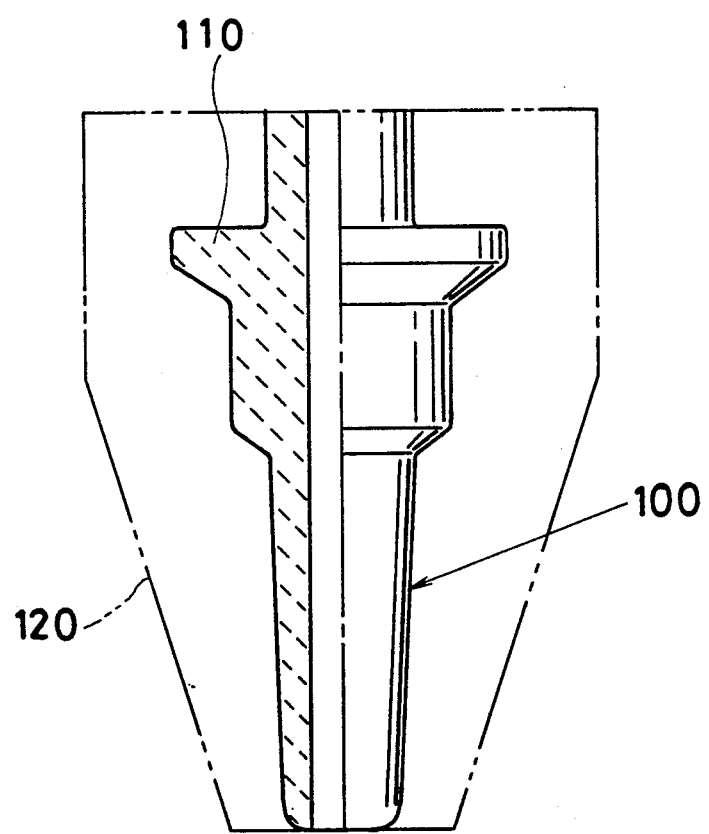
FIG. 9 is a view of a prior art spark plug, and showing its manufacturing method.

As modification forms, press machine for making press compaction may be of a metallic device (D) shown in FIGS. 7 and 8. Instead of oil pressure, hydraulic pressure (W) may be used.

To the primary particle of aluminum nitride (AlN) powder is employed 0.2–10 microns in spherical diameter, elements such as Fe, Si, O and the like are inevitably added, however, weight percentage of these element should be limited within 1%, because presence of these elements works to reduce a thermal conductivity of 60 W/mk.

As sintering agents, suitable combination of the following groups may be added.

(i) Oxides of alkali earth metal such as CaO, BaO, SrO and the like.

(ii) Nitrates such as $Ca(NO_3)_2$, or carbonates such as $CaCO_3$, $BaCO_3$ and $SrCO_3$ or the like.

(iii) Rare earth metals such as $Y_2O_3$, $La_2O_3$, $CeO_2$, $PrO_2$, $Nd_2O_3$, $Sm_2O_3$, $Gd_2O_3$, $Dy_2O_3$ or the like.

(iv) Rare earth fluorides such as $YF_3$ or the like.

Figure 10:
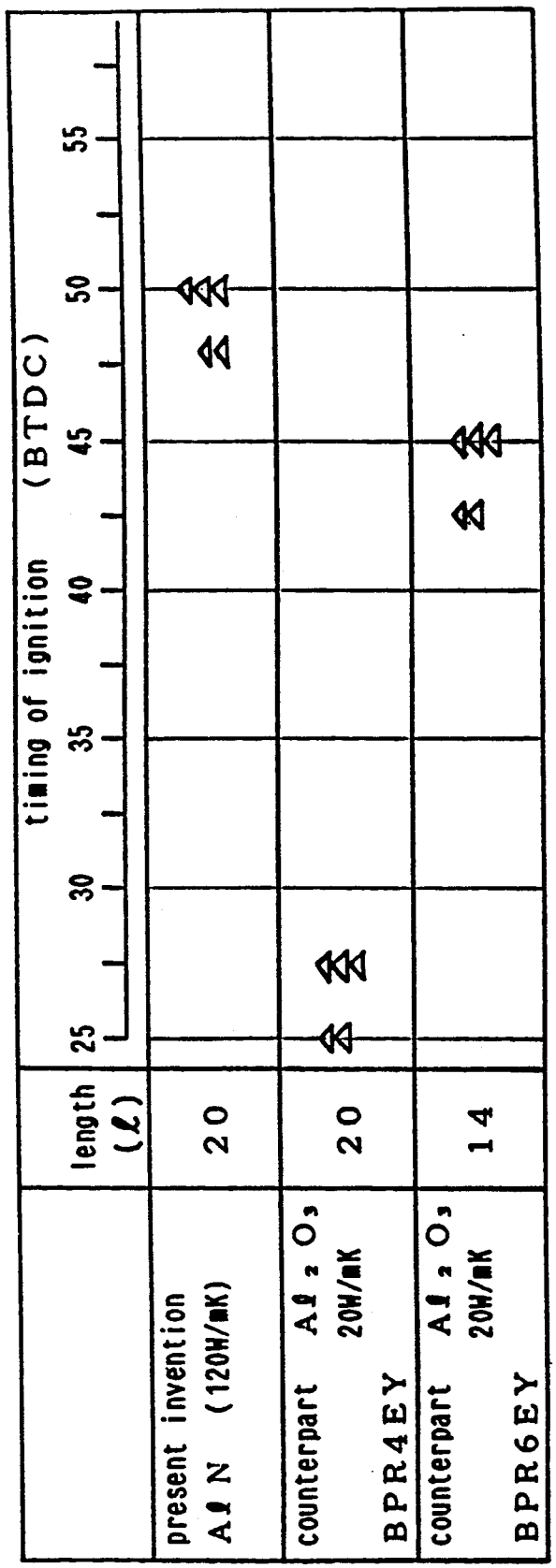
FIGS. 10 and 11 present in tabular form the results of tests showing the improved operations of a spark plug in accordance with this invention.

Preignition resistance test is carried out with 1600 cc 4-cylinder DOHC engine employed under the condition of 5500 rpm×4/4, and with ignition advancement angle made variable. The result is shown in FIG. 10 which apparently shows that preignition resistance has improved. Where denotation (l) indicates the length dimension corresponding to that in which the front half piece of insulator 2a extends 20 mm from the front end of metallic shell 1.

Figure 11:
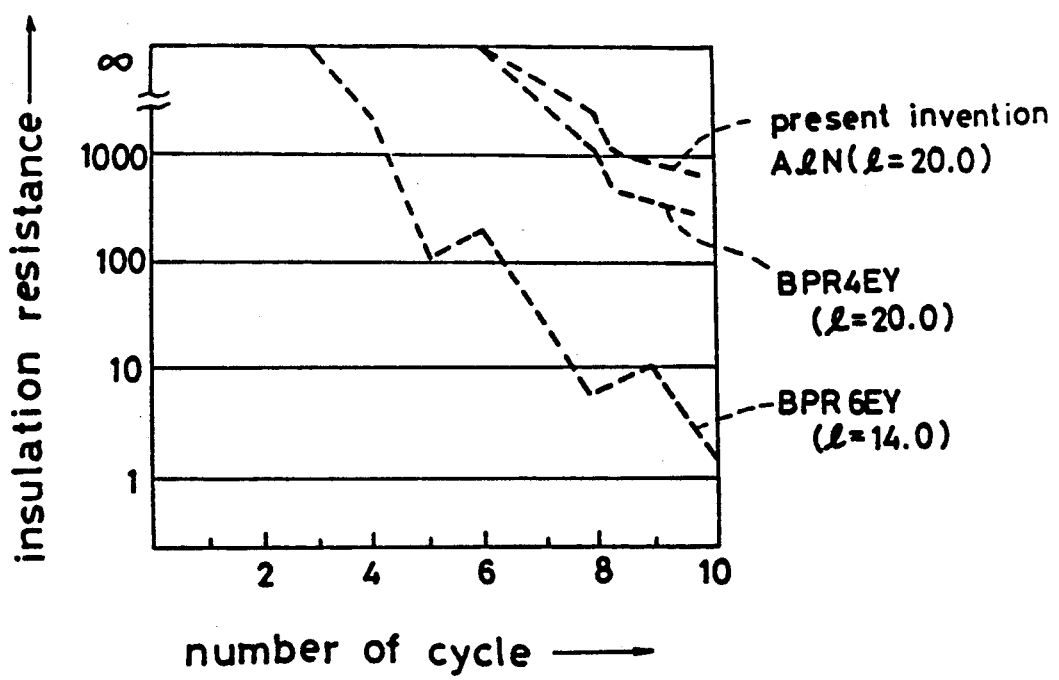

Fouling resistance test is carried out with 1600 cc 4-cylinder DOHC engine employed. Each cycle is determined by a cyclic operation of idling (90 sec) - low velocity (35 Km/h 120 sec) at a room temperature of ten freezing degrees centigrade. The result is as seen in FIG. 11 which shows that the fouling resistance becomes higher with the increase of the length (l).

Endurance test is carried out with 2000 cc 6-cylinder engine employed for 100 hours at full throttle (corresponding to the distance of 2000 Km). Transformation of (AlN) into alumina ($Al_2O_3$) is found only limited at an outer layer (10–20 microns) with no deterioration of heat resistance.

While only preferred embodiments of the invention has been described, it is appreciated that numerous minor changes in the construction and arrangements of the parts may be made without departing from the spirit and scope of the invention as defined in the following claims.

What is claimed is:

1. A spark plug structure comprising a metallic shell, a ceramic insulator positioned within the metallic shell and a center electrode placed within the ceramic insulator, said ceramic insulator comprising a front half piece extending beyond said metallic shell and having an enlarged projection head at one end and a separate rear half piece provided with a recess at one end corresponding to the projection head of said front half piece, said two half pieces being joined and bonded together upon fitting the projection head of said front half piece into the recess of said rear half piece.

2. A spark plug structure in accordance with claim 1 wherein said projection head of said front half piece is polygonal in shape and wherein the recess of said rear half piece corresponds to said polygonal shape to prevent rotary movement of said front half piece and said rear half piece when said pieces are fitted and bonded together.

3. A spark plug structure in accordance with claim 1 wherein said front half piece is made of aluminum nitride and wherein said rear half piece is made of alumina.

4. A spark plug in accordance with claim 1 wherein said front half piece is made of aluminum nitride AlN and said rear half piece is made of alumina $Al_2O_3$ and wherein said front half piece projects by a length of 20 mm from the front of said metallic shell.

5. A spark plug structure in accordance with claim 1, wherein said center electrode is concentrically placed within the ceramic insulator to form a spark plug gap with a ground electrode depended from the metallic shell which is made of low carbide steel.

* * * * *